(12) United States Patent
Moenkemoeller

(10) Patent No.: US 12,134,304 B2
(45) Date of Patent: Nov. 5, 2024

(54) MOTOR-VEHICLE AIR-TREATMENT DEVICE

(71) Applicant: Ralf Moenkemoeller, Bielefeld (DE)

(72) Inventor: Ralf Moenkemoeller, Bielefeld (DE)

(73) Assignee: HEPA GMBH, Muenster (DE)

( * ) Notice: Subject to any disclaimer, the term of this patent is extended or adjusted under 35 U.S.C. 154(b) by 482 days.

(21) Appl. No.: 17/384,946

(22) Filed: Jul. 26, 2021

(65) Prior Publication Data

US 2022/0032740 A1 Feb. 3, 2022

(30) Foreign Application Priority Data

Jul. 30, 2020 (DE) .......................... 102020004627.4

(51) Int. Cl.
*B60H 3/00* (2006.01)
*B60H 1/00* (2006.01)

(52) U.S. Cl.
CPC ....... *B60H 3/0078* (2013.01); *B60H 1/00735* (2013.01); *B60H 1/00964* (2013.01); *B60H 1/00814* (2013.01)

(58) Field of Classification Search
CPC ............ B60H 1/00642; B60H 1/00735; B60H 1/00964; B60H 1/00814; B60H 3/0071; B60H 3/0078; B60H 3/00735; B60H 3/00814; B60H 3/0035; B60H 2003/005; A61L 9/00; A61L 9/015; A61L 9/22; F24F 8/30; F24F 8/40; F24F 8/50
USPC ......................................................... 454/156
See application file for complete search history.

(56) References Cited

U.S. PATENT DOCUMENTS

| 7,842,233 | B2 * | 11/2010 | Wiedemann | ......... B60H 3/0071 |
| | | | | 422/186.05 |
| 2005/0031503 | A1 * | 2/2005 | Fox | ........................ F24F 8/192 |
| | | | | 422/186.04 |

FOREIGN PATENT DOCUMENTS

WO WO-2010037466 A1 * 4/2010 ........... B01D 46/009

OTHER PUBLICATIONS

Translation of WO 2010037466, Patent Translate from espacenet on Nov. 2, 2023 (Year: 2023).*
Translation of WO 2010037466, Patent Translate from espacenent on Nov. 2, 2023 (Year: 2023).*

* cited by examiner

*Primary Examiner* — Allen R. B. Schult
(74) *Attorney, Agent, or Firm* — Andrew Wilford

(57) ABSTRACT

An air-treatment system for a motor vehicle having an air conditioner, the system has an electrically powered air-treatment device in the air conditioner that treats air of an airflow generated by the air conditioner, a controller in the air conditioner that controls the air-treatment device in accordance with operating parameters of the air conditioner in which the air-treatment device is installed, and an electrical coder in the air-treatment device for identifying characteristics of the air-treatment device, that is electrically connectable with the controller on installation of the air-treatment device, and that is interogable after electrical connection to the controller has been established. This coder serves for detecting when the electrical coding means is electrically connected to the controller and for disconnecting electric power feed to the air-treatment device in the absence of an electrical connection between the coder and the controller.

4 Claims, 1 Drawing Sheet

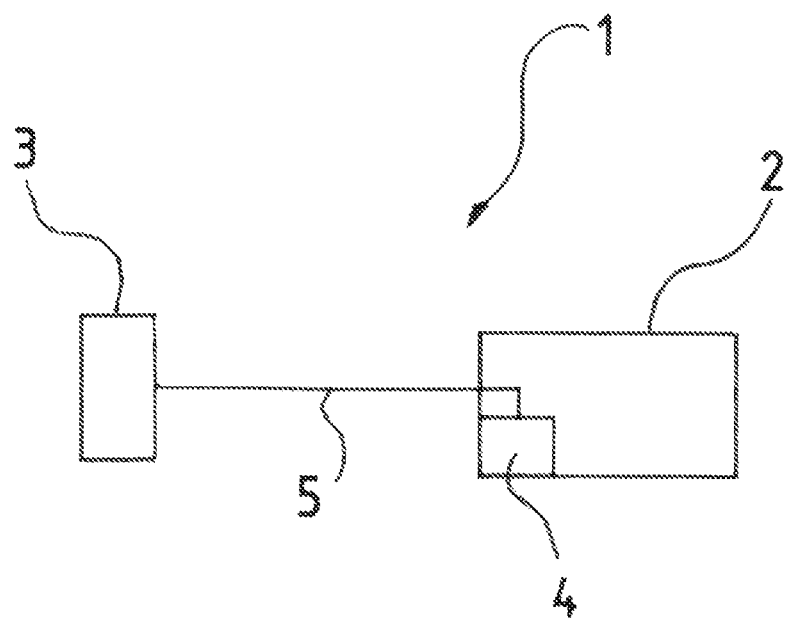

MOTOR-VEHICLE AIR-TREATMENT DEVICE

FIELD OF THE INVENTION

The invention relates to an air-treatment system for motor vehicles, for example to an ionizer for installation in a motor-vehicle air conditioner.

BACKGROUND OF THE INVENTION

Such an air-treatment device that can treat air of an airflow generated by the motor-vehicle air conditioner typically has a controller that can control the air-treatment device in accordance with parameters of the motor-vehicle air conditioner in which the air-treatment device is installed.

Instead of designing the air-treatment system as an ionizer, it can also be designed as an ozone generator device, as an electric heater, or the like.

If such an air-treatment system is to be created for large-scale use in the automotive sector, it is advantageous if common parts are used in considerable numbers. In the automotive sector, such common parts include, in particular, electrical control devices, since the development effort for such electrical control devices is very high due to the comparatively complicated requirement profile placed on such control devices (reliability, EMC, functional testing, etc.).

OBJECT OF THE INVENTION

Accordingly, the object of the invention is to refine the generic air-treatment system for motor vehicles described at the outset in such a way that its controller can be designed as a universal control device and long-term reliable operation of the air-treatment system can be achieved.

SUMMARY OF THE INVENTIONl

This object is achieved in accordance with the invention in that the air-treatment device of the air-treatment system for motor vehicles has an electrical coding means which is characteristic of the variant of the air-treatment device, can be brought into electrical connection with the controller on installation of the air-treatment device and the controller, and can be interrogated by the controller after the electrical connection to the controller has been established. The air-treatment device of the air-treatment system according to the invention can thus be operated by the controller, which interrogates the electrical coding means of the air-treatment device, in accordance with the operating parameters provided for the particular variant of the air-treatment device. By means of the electrical coding means of the air-treatment device, it is clearly determined in which variant the air-treatment device is designed. By means of the controller of the air-treatment system according to the invention, which controller is designed as a universal control device, a wide range of different variants of the air-treatment device can be operated in accordance with the operating parameters provided for it, which operating parameters are specified by the motor-vehicle air conditioner in which the air-treatment device is installed.

By way of explanation, it should be noted that the motor-vehicle air conditioners of different motor vehicle series are designed for different maximum air flow rates. The capacity of such a motor-vehicle air conditioner also depends, for example, on the volume of the vehicle interior. For example, an ionizer of the air-treatment system is then also designed in accordance with the performance data of a motor-vehicle air conditioner. In the case of large ionizers, which are suitable for a larger air flow rate, a higher operating current is required than for smaller ionizers, which are intended for smaller air volumes. In the case of the air-treatment system according to the invention, the variant of the air-treatment device or ionizer can be recognized by a controller, designed as a universal control device, on the basis of the electrical coding means of the air-treatment device.

Accordingly, the air-treatment device or ionizer of the air-treatment system can be operated with the correct operating parameters by the controller designed as a universal control device.

Advantageously, by means of the electrical coding means of the air-treatment system according to the invention, the variant of the air-treatment device can be identified and forwarded to the controller in such a way that, by means of the controller, the air-treatment device can be controlled according to the operating parameters provided for this air-treatment device. In order to meet increased safety requirements for the operation of the air-treatment system for motor vehicles according to the invention, it is advantageous if it can be detected by the controller of the air-treatment system if there is no electrical connection between the controller on the one hand and the electrical coding means on the other hand.

Expediently, by means of the controller of the air-treatment system according to the invention, an operating voltage of the air-treatment device can be set to a value that is harmless to living beings if it is detected by the controller that there is no electrical connection between the electrical coding means on the one hand and the controller on the other hand.

Furthermore, according to a further advantageous embodiment of the air-treatment system according to the invention, an operating voltage of the air-treatment device can be switched off by its controller if it is detected by the controller that there is no electrical connection between the coding means on the one hand and the controller on the other hand.

The electrical connection between the controller on the one hand and the electrical coding means on the other hand can be realized more simply from a constructional viewpoint by spring contacts, a preferably fixed wiring, sliding contacts, a plug connection, etc.

The electrical coding means of the air-treatment device of the air-treatment system according to the invention can be formed as a passive two-pole, for example as a resistor, as a capacitor or as a coil, or as an ID chip with low technical effort from a constructional viewpoint.

In a particularly simple and reliably designable technical form, the electrical coding means can be realized as a resistor with a discrete resistance value, wherein the discrete resistance value characterizes the operating voltage provided for the operation of the air-treatment device.

In the following, the invention is explained in more detail by an embodiment with reference to the drawing, in which an air-treatment system for motor vehicles according to the invention is explained by way of example by an embodiment.

An air-treatment system 1 for motor vehicles shown in principle in the single FIGURE is installed in a motor-vehicle air conditioner provided in the motor vehicle, which vehicle air conditioning system is not shown in the single FIGURE.

In the case of the air-treatment system 1, this may be, for example, an ionizer, an ozone generator device, an electric heating device, or a similar unit.

BRIEF DESCRIPTION OF THE DRAWING

The sole FIGURE of the drawing is a schematic diagram of an air treatment system according to the invention.

SPECIFIC DESCRIPTION OF THE INVENTION

The embodiment of an air-treatment system 1 according to the invention is divided into an air-treatment device 2 and a controller 3.

The air-treatment device 2 serves to treat the air present in the motor-vehicle air conditioner or the airflow generated therein, for example to ionize it, to provide it with ozone or to heat it. Correspondingly, the air-treatment device 2 of the air-treatment system 1 is a suitable location within the motor-vehicle air conditioner.

The air-treatment device is also designed depending on the design and capacity of the motor-vehicle air conditioner in which the air-treatment device 2 is integrated.

The air-treatment device 2 can be controlled by the controller 3 of the air-treatment system 1. In the case of the controller 3 of the air-treatment system 1 according to the invention shown in the single FIGURE, this is a standardized universal control device, by means of which different air-treatment devices 2, which are designed with different capacities in accordance with motor-vehicle air conditioners of differing design, can be controlled. Accordingly, the air-treatment device 2 of the air-treatment system 1 according to the invention is designed with an electrical coding means 4 or has an electrical coding means 4. This electrical coding means 4 is characteristic of that variant of the air-treatment device 2 in which the electrical coding means 4 is installed.

The controller 3 of the air-treatment system 1 is connected to the air-treatment device 2 and also to the electrical coding means 4 of the air-treatment device 2 by a connection 5. The connection 5 between the air-treatment device 2 and the electrical coding means 4 on the one hand and the controller 3 of the air-treatment system 1 on the other hand is created during assembly of the air-treatment device 2 and the controller 3. As soon as the connection 5 is closed, the connection between the controller 3 on the one hand and the electrical coding means 4 is also established. Accordingly, the variant of the air-treatment device 2 can be interrogated by the controller 3. Since the variant of the air-treatment device 2 is adapted to the requirement profile set by the design of the motor-vehicle air conditioner, the controller 3 of the air-treatment system 1 is able to control the air-treatment device 2 accordingly in an open-loop or closed-loop fashion.

The controller 3 can be suitable accordingly for a large number of variants of air-treatment devices 2.

Accordingly, the development effort for such a controller 3, for which the most diverse requirements, such as reliability, EMC, functional testing, etc., have to be taken into account, can be considerably reduced, since a correspondingly adapted controller does not have to be developed for each variant of an air-treatment device 2 or a motor-vehicle air conditioner.

The interaction between the controller 3 and the electrical coding means 4 makes it possible for different variants of air-treatment devices 2 or air-treatment systems 1 to be operated with the controller 3, which is designed as a universal control device.

The connection 5 between the electrical coding means 4 on the one hand and the controller 3 on the other hand can be realized by spring contacts, fixed wiring, sliding contacts, plugs etc. The electrical coding means 4 can be designed as a passive two-pole, for example as a resistor, a capacitor or a coil. It is also quite possible to design the electrical coding means 4 as an ID chip.

If the electrical coding means 4 is designed as an electrical resistor in a particularly simple embodiment in terms of construction, the resistance value of this electrical resistor may be specific to the particular variant of the air-treatment device 2 in which the electrical coding means 4 is installed.

In the case of the design of the air-treatment system 1 as an ionizer, the main parameter for the operation of said device is the electrical operating voltage. Such an electrical operating voltage can be coded very simply and universally by an electrical resistance. For example, discrete resistance values can stand for different operating voltages, for example 1 kOhm for 1000 volts, 2 kOhm for 2000 volts and 12 kOhm for 12000 volts.

The corresponding resistance value of the electrical coding means 4 is interrogated and detected by the controller 3, after which the controller 3 controls the air-treatment device 2 in open-loop or closed-loop fashion according to the detected resistance value of the electrical coding means 4.

By means of the electrical coding means 4 of the air-treatment system 1, it is also possible to provide thorough personal protection with comparatively little effort, because the interrogation of the electrical coding means 4 of the air-treatment device 2 by the controller 3 can also be used to detect faults. If the value detected in the controller 3 for the electrical coding means 4 lies outside a permissible value range or no valid value can be determined at all, a fault or malfunction is present. A reason for such a malfunction can be, for example, that the air-treatment system 1 is not assembled or is not correctly assembled. The reason for this can be, for example, a temporary service procedure during which the air-treatment system 1 or its air-treatment device 2 is replaced, cleaned or serviced. During such a service procedure, the ignition of the motor vehicle in the motor-vehicle air conditioner of which the air-treatment system 1 is installed should be switched off. However, this is not guaranteed in all cases.

The controller 3 of the air-treatment system 1 described above, by means of which the electrical coding means 4 of the air-treatment device 2 is interrogated, does not recognize a valid coding value of the electrical coding means 4 in such a case. For safety reasons or in order to implement protection against contact, the operating voltage of the air-treatment system 1 is then limited to a value that is harmless to individuals, or the operating voltage of the air-treatment system 1 is switched off altogether.

In the case of a control device without interrogation of a valid electrical coding means, the control device could switch the operating voltage of the air-treatment device 2, for example, to 12000 V when the ignition of the motor vehicle is switched on, without plausibility check. Thus, it would not be ruled out that the personnel performing the service procedure might come into contact with this high voltage.

I claim:

1. An air-treatment system for a motor vehicle having an air conditioner, the system comprising:

an air-treatment device in the air conditioner, that is electrically powered, and that treats air of an airflow generated by the air conditioner;
a controller in the air conditioner that controls the air-treatment device in accordance with operating parameters of the air conditioner in which the air-treatment device is installed; and
an electrical coding means that is
- in the air-treatment device,
- formed as a passive resistor with a discrete resistance value that characterizes an operating voltage of the air-treatment device,
- electrically connectable with the controller on installation of the air-treatment device, and
- interogable after electrical connection to the controller has been established,
the controller serving for
- detecting when the electrical coding means is electrically connected to the controller and
- disconnecting electric power feed to the air-treatment device in the absence of an electrical connection between the coding means and the controller.

2. The air-treatment system according to claim 1, wherein the electrical coding means identifies and forwards the characteristics of the air-treatment device to the controller in such a way that the controller can control the air-treatment device according to the characteristics of this air-treatment device.

3. The air-treatment system according to claim 1, wherein the controller sets an operating voltage of the air-treatment device at a level that is not a danger to life in contact with the controller when there is no electrical connection between the electrical coding means and the controller.

4. The air-treatment system according to claim 1, wherein the electrical connection between the controller and the electrical coding means is via spring contacts, fixed wiring, sliding contacts, or a plug connection.

* * * * *